(12) United States Patent
Toksoz et al.

(10) Patent No.: US 10,536,547 B2
(45) Date of Patent: Jan. 14, 2020

(54) REDUCING REDIRECTS

(71) Applicant: Google LLC, Mountain View, CA (US)

(72) Inventors: Tuna Toksoz, Mountain View, CA (US); Ryan Scott Elmquist, San Francisco, CA (US)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 15/477,713

(22) Filed: Apr. 3, 2017

(65) Prior Publication Data

US 2018/0288180 A1    Oct. 4, 2018

(51) Int. Cl.
*G06F 15/16* (2006.01)
*H04L 29/08* (2006.01)

(52) U.S. Cl.
CPC ...... *H04L 67/2814* (2013.01); *H04L 67/2842* (2013.01)

(58) Field of Classification Search
CPC . H04L 67/2814; H04L 67/2842; H04L 67/42; H04L 12/5692; H04L 67/02; H04L 67/34; H04N 21/2343
See application file for complete search history.

(56) References Cited

U.S. PATENT DOCUMENTS

| | | |
|---|---|---|
| 2010/0262717 A1 | 10/2010 | Critchley et al. |
| 2012/0117270 A1 | 5/2012 | Scoda |
| 2012/0311017 A1 * | 12/2012 | Sze ...... H04L 67/2814 709/202 |
| 2015/0019690 A1 * | 1/2015 | Sarat ...... H04L 67/02 709/219 |
| 2015/0019691 A1 * | 1/2015 | Sarat ...... H04L 67/02 709/219 |

FOREIGN PATENT DOCUMENTS

CN          1422468          6/2003

OTHER PUBLICATIONS

International Search Report and Written Opinion issued in International Application No. PCT/US2017/025725, dated Nov. 16, 2017, 14 pages.
Written Opinion issued in International Application No. PCT/US2017/025725, dated Feb. 11, 2019, 10 pages.

* cited by examiner

*Primary Examiner* — Cheikh T Ndiaye
(74) *Attorney, Agent, or Firm* — Fish & Richardson P.C.

(57) ABSTRACT

Methods, systems, and computer readable medium for reducing redirects of a client device are disclosed. A method for directing a user to a destination page includes detecting, by one or more servers, interaction with a digital component at a client device, identifying, by the one or more servers, a different server to which the one or more servers are to redirect the client device and a destination page being requested through the interaction with the digital component, redirecting, by the one or more servers, the client device to a destination page without redirecting the client device to the different server, and pinging, by the one or more servers, the different server with a request that includes interaction data corresponding to the interaction with the digital component.

20 Claims, 5 Drawing Sheets

REDUCING REDIRECTS

BACKGROUND

This document relates to reducing redirects. The Internet provides access to a variety of resources, and in some situations, a user wishing to access a resource may be redirected to multiple different servers before finally being redirected to the server that hosts the resource.

SUMMARY

In general, one innovative aspect of the subject matter described in this specification can be embodied in a method that includes detecting, by one or more servers, interaction with a digital component at a client device. The method includes identifying, by the one or more servers, an intermediary server to which the one or more servers are to redirect the client device and a destination server being requested through the interaction with the digital component. The method includes redirecting, by the one or more servers, the client device to the destination server without redirecting the client device to the intermediary server. The method includes pinging, by the one or more servers, the intermediary server with a request that includes interaction data corresponding to the interaction with the digital component.

These and other embodiments can each optionally include one or more of the following features.

In some examples, identifying the intermediary server includes examining a URL used to contact the one or more servers, and extracting information specifying a path of the intermediary server. In some examples, the method includes receiving, from the intermediary server, a redirect response that redirects the one or more servers to a second intermediary server and pinging, by the one or more servers, the second intermediary server with a second request that includes data from the redirect response.

In some examples, pinging the intermediary server includes initiating a second redirect path that differs from the redirection of the client device to the destination server. In some examples, pinging the intermediary server includes starting a counter when the pinging is initiated, tracking an elapsed request time using the counter, and retrying the pinging of the intermediary server when the elapsed request time exceeds a timeout threshold prior to the one or more servers receiving a response from the intermediary server.

In some examples, the client device is a mobile device communicating over a wireless communications network and the one or more servers communicate over a wired communications network independent of the mobile device. In some examples, the method includes following, by the one or more servers, a multi-server redirect path that the client device would have followed had the one or more servers not redirected the client device to the destination server.

In another general aspect, a system includes a data store storing interaction data corresponding to client-side interaction with various digital components, a front-end interface that includes a communications interface that enables communication over one or more communications networks, and a tracking server connected to the front-end interface, wherein the tracking server breaks a redirect chain being followed by a client device by performing operations. The operations include detecting, by the one or more servers, interaction with a digital component at a client device, identifying, by the one or more servers, a different server to which the one or more servers are to redirect the client device and a destination page being requested through the interaction with the digital component, redirecting, by the one or more servers, the client device to a destination page without redirecting the client device to the different server, and pinging, by the one or more servers, the different server with a request that includes interaction data corresponding to the interaction with the digital component.

In some examples, identifying the different server includes examining a URL used to contact the one or more servers, and extracting information specifying the different server. In some examples, the operations include receiving, from the different server, a redirect response that redirects the one or more servers to a second different server, and pinging, by the one or more servers, the second different server with a second request that includes data from the redirect response.

In some examples, pinging the different server includes initiating a second redirect path that differs from the redirection of the client device to the destination page. In some examples, pinging the different server includes starting a counter when the pinging is initiated, tracking an elapsed request time using the counter, and retrying the pinging of the different server when the elapsed request time exceeds a timeout threshold.

In some examples, the client device is a mobile device communicating over a wireless communications network and the one or more servers communicate over a wired communications network independent of the mobile device. In some examples, the operations include following, by the one or more servers, a multi-server redirect path that the client device would have followed had the one or more servers not redirected the client device to the destination page.

In another general aspect, a non-transitory computer readable medium stores instructions that when executed by one or more computing devices, cause the one or more computing devices to perform operations. The operations include detecting, by one or more servers, interaction with a digital component at a client device, identifying, by the one or more servers, a different server to which the one or more servers are to redirect the client device and a destination page being requested through the interaction with the digital component, redirecting, by the one or more servers, the client device to a destination page without redirecting the client device to the different serve, and pinging, by the one or more servers, the different server with a request that includes interaction data corresponding to the interaction with the digital component.

In some examples, identifying the different server includes examining a URL used to contact the one or more servers, and extracting information specifying the different server. In some examples, the operations include receiving, from the different server, a redirect response that redirects the one or more servers to a second different server, and pinging, by the one or more servers, the second different server with a second request that includes data from the redirect response.

In some examples, pinging the different server includes initiating a second redirect path that differs from the redirection of the client device to the destination page. In some examples, pinging the different server includes starting a counter when the pinging is initiated; tracking an elapsed request time using the counter, and retrying the pinging of the different server when the elapsed request time exceeds a timeout threshold.

In some examples, the client device is a mobile device communicating over a wireless communications network and the one or more servers communicate over a wired communications network independent of the mobile device.

In another general aspect, a method includes detecting, by one or more servers, interaction with a digital component at a client device. The method also includes identifying, by the one or more servers, an intermediary server that can redirect the client device to a destination resource being requested through the interaction with the digital component. The method includes pinging, by the one or more servers, the intermediary server with a request that includes interaction data corresponding to the interaction with the digital component and receiving, by the one or more servers, an identifier for the destination resource via the intermediate server. The method includes redirecting, by the one or more servers, the client device to the destination resource using said identifier.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. When a client device makes a request for a resource, the client device can skip one or more intervening redirects that the client device would otherwise have to make, thereby reducing the number of redirects that the client device must follow to obtain the resource from a destination server that hosts the resource. Enabling the client device to skip intervening redirects (e.g., redirects that occur between a client device's initial request for a resource and the client device being directed to the destination server that hosts the resource) reduces the likelihood of an error that will prevent the client device from obtaining the resource from the destination server. Examples of errors that will prevent the client device from obtaining the resource from the destination server include the client device encountering a non-responsive intermediate server prior to being redirected to the destination server that hosts the resource or a temporary network outage that affects one of the intermediary servers. The client device may lose network connectivity while being redirected to an intermediate server prior to being redirected to the destination server. In some examples, an intermediary server may provide erroneous redirect data that lead the client device to the incorrect destination.

The amount of time required for the client device to obtain the resource from the destination server is reduced when the number of redirects is reduced because each redirect to an intermediary server increases the amount of time that is required to obtain the resource from the destination server. In the context of mobile devices, the amount of time added by each redirect can be substantial due to the nature of how network calls are performed in a wireless (e.g., cellular) network, and can lead to a negative user experience or page load errors (e.g., due to fluctuating wireless network availability or loading). As such, it is important to reduce the number of redirects of a mobile device in order to reduce the latency introduced by those redirects. Reducing the number of redirects also reduces the amount of mobile data used, thereby providing a more efficient use of mobile data, which may be limited for many users. A discussed throughout this document, instead of redirecting the client device to the intermediary servers, using the techniques discussed herein, a given server contacts the intermediary servers on behalf of the client device rather than requiring the client device to contact the intermediary servers. For example, the given server can follow a redirect chain (e.g., a series of calls to intermediary servers) that the client device would have followed rather than requiring the client device to follow the redirect chain.

The given server generally communicates with the intermediary servers over a reliable communications link, thereby increasing the likelihood that each intermediary server is provided with the appropriate information. For example, the communication with the intermediary servers may occur over a high-speed wired network, such as an optical network, digital subscriber line network, or a hybrid network. Furthermore, using the given server to communicate with the intermediary servers enables the user of additional reliability techniques, such as the server being able to utilize a "retry" when a request sent to one of the intermediary servers has not been fulfilled within a specified amount of time. For example, if a "timeout" occurs before one of the intermediary servers responds, the given server can initiate a retry that transmits a second instance of the request to the intermediate server that failed to respond. The use of a "retry" is generally not available when the client device is tasked with contacting each intermediary server. As such, the techniques discussed in this document enhance the reliability with which data from the client device is delivered to each of the intermediary servers in a redirect chain.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems, and devices that reduce the number of redirects that a client device must follow when attempting to access a resource requested by the client device. In some situations, when a request for a resource is generated through interaction with a digital component at a client device, the initial request that is generated may direct the client device to a given server that is different from the server that hosts the requested resource. For example, the given server may be a tracking server that tracks interactions with the digital component. In this example, the tracking server examines the request, and in particular situations contents of the uniform resource locator (URL), that is used to contact the tracking server to identify, extract, and log information related to the interaction with the digital component (e.g., an identifier of the client device at which the interaction occurred or an account identifier of a user that performed the interaction).

Once the tracking server has obtained information from the request, the tracking server redirects the client device along a path toward the destination server that hosts the requested resource (e.g., using a 301 or 302 redirect command that specifies the next server to be contacted). In some situations, a redirect that is issued by a tracking server may be to an intermediary server that differs from the destination server. For example, in situations where a provider of the digital component utilizes various different tracking services, the intermediary server may be another server that is required to obtain information about interactions with the digital component in order to provide another tracking service. When the client device is redirected to this intermediary server, the client device may be redirected to another intermediary server and/or follow a chain of sequential redirects to various intermediary servers before finally being redirected to the destination page that hosts the resource that was originally requested through the interaction with the digital component.

As discussed in more detail below, the number of redirects that a client device is required to follow prior to reaching the destination server can be reduced by offloading the redirect responsibilities to a given server device. In some implementations, a given server (e.g., the initial server that is contacted by the client device in response to the interaction with the digital component or a subsequent intermediary server) can break the redirect chain that is followed by the client device by redirecting the client device directly to the destination server instead of redirecting the client device to an intermediary server. When the given server redirects the client device to the destination server, the given server can follow the redirect path that would have otherwise been followed by the client device to ensure that each intermediary server in the redirect chain is contacted with information about the interaction that is provided by the client device. As such, the resource being requested by the client device is presented at the client device in less time than would have been required if the full redirect chain had been followed, and the reliability of successful delivery of the requested resource to the client device is increased by reducing the number of communications links that the client device establishes with intermediary servers.

Note that the techniques described in this document can also be implemented in situations where a user is browsing through available applications (e.g., in an online application store or a web browser) or in other environments (e.g., on publisher web pages). For brevity, much of the description that follows will refer to the search results environment.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but could be a combination of content from multiple sources. Digital components from multiple different sources can be combined into a single electronic document (e.g., collection of various different digital components), and portions of various digital components from different sources can be combined into a single digital component with information extracted from search results (or other portions of content).

Figure 1:
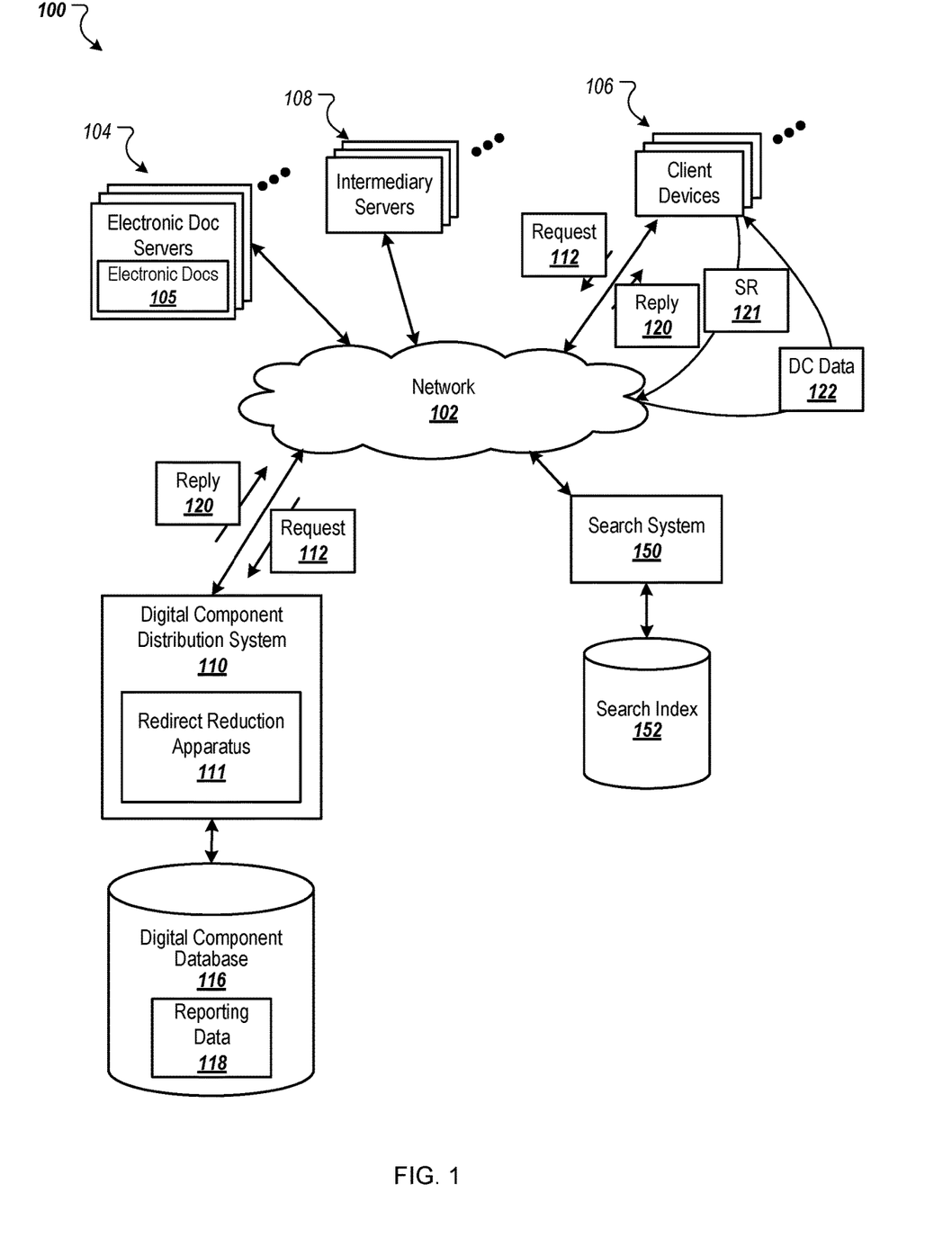
FIG. 1 is a block diagram of an example environment in which digital components are distributed for presentation with electronic documents.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, intermediary servers 108, and a digital component distribution system (DCDS) 110 (also referred to as a component distribution system). The example environment 100 may include many different electronic document servers 104, client devices 106, and intermediary servers 108.

A client device 106 is an electronic device that is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to client devices 106 by electronic document servers 104 ("Electronic Doc Servers"). For example, the electronic document servers 104 can include servers that host publisher websites. In this example, the client device 106 can initiate a request for a resource, such as a given publisher webpage, and the electronic document server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can request a resource, such as files required to install an app, download the files at the client device 106, and then execute the downloaded app locally.

Electronic documents 105 can include a variety of content. For example, an electronic document 105 can include static content (e.g., text or other specified content) that is within the electronic document itself and/or does not change over time. Electronic documents 105 can also include dynamic content that may change over time or on a per-request basis. For example, a publisher of a given electronic document 105 can maintain a data source that is used to populate portions of the electronic document 105. In this example, the given electronic document 105 can include one or more tags or scripts that cause the client device 106 to request content from the data source when the given electronic document 105 is processed (e.g., rendered or executed) by a client device 106. The client device 106 integrates the content obtained from the data source into the given electronic document 105 to create a composite electronic document including the content obtained from the data source.

In some situations, a given electronic document 105 can include one or more digital component tags or digital component scripts that reference the DCDS 110. In these situations, the digital component tags or digital component scripts are executed by the client device 106 when the given electronic document 105 is processed by the client device 106. Execution of the digital component tags or digital component scripts configures the client device 106 to generate a request for a resource including one or more digital components 112 (referred to as a "component request"), which is transmitted over the network 102 to the DCDS 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the DCDS 110 can use to select one or more digital components provided in response to the request. The component request 112 is transmitted, by the client device 106, over the network 102 (e.g., a telecommunications network) to a server of the DCDS 110.

The component request 112 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the DCDS 110. Similarly, event data specifying keywords associated with the electronic document ("document keywords") or entities (e.g., people, places, or things) that are referenced by the electronic document can also be included in the component request 112 (e.g., as payload data) and provided to the DCDS 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The DCDS 110 chooses digital components that will be presented with the given electronic document in response to receiving the component request 112 and/or using information included in the component request 112. In some implementations, a digital component is selected (using the techniques described herein) in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document 105 is no longer presented at the client device 106 when the digital component is provided.

In some implementations, the DCDS 110 is implemented in a distributed computing system that includes, for example, a redirect reduction apparatus 111 (e.g., a server that includes computing hardware and code) and/or a set of multiple computing devices that are interconnected and identify and distribute digital components in response to requests 112. The set of multiple computing devices operate together to identify a set of digital components that are eligible to be presented in the electronic document from among a corpus of millions of available digital components. The millions of available digital components can be indexed, for example, in a digital component database 116. Each digital component index entry can reference the corresponding digital component and/or include distribution parameters that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

The redirect reduction apparatus (RRA) 111 of the DCDS 110 can be a tracking server that communicates with various intermediary servers, such as the intermediary servers 108. The RRA 111 can direct the client device 106 to resources requested by the client device 106 and hosted on various servers, such as the electronic doc servers 105. The RRA 111 includes a front-end interface through which a user can provide input. For example, the front-end interface can include a user interface that includes user interface elements such as buttons and text entry fields. The front-end interface includes a communications interface that enables communication over one or more communications networks, such as the network 102. The RRA 111 can communicate with the intermediary servers 108 through the communications interface. For example, the RRA 111 can communicate with the intermediary servers 108 through a proxy server using the communications interface to provide data such as interaction tracking data for the client device 106 when the client device 106 requests a digital component.

The identification of the eligible digital component can be segmented into multiple tasks that are then assigned among computing devices within a set of multiple computing devices. For example, different computing devices in the set of multiple computing devices can each analyze a different portion of the digital component database 116 to identify various digital components having distribution parameters that match information included in the component request 112. The different computing devices in the set of multiple computing devices can use reporting data 118, including user interaction data with particular digital components, stored in the digital component database 116. In some implementations, each given computing device in the set of multiple computing devices can analyze a different data dimension (or set of dimensions) and pass (e.g., transmit) results of the analysis back to the DCDS 110. For example, the results 118a-118c provided by each of the computing devices in the set 114 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The DCDS 110 aggregates the results received from the set of multiple computing devices and uses information associated with the aggregated results to select one or more digital components that will be provided in response to the request 112. For example, the DCDS 110 can select a set of winning digital components (one or more digital components) based on the outcome of one or more component evaluation processes, as discussed below. In turn, the DCDS 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers. For example, the instructions in the reply data 120 can include a network location (e.g., a Uniform Resource Locator (URL)) and a script that causes the client device 106 to transmit a server request (SR) 121 to the intermediary server 108 to obtain a given winning digital component from the intermediary server 108. In response to the request, the intermediary server 108 will identify the given winning digital component specified in the server request 121 (e.g., within a database storing multiple digital components) and transmit, to the client device 106, digital component data (DC Data) 122 that presents the given winning digital component in the electronic document at the client device 106.

In some implementations, when the client device 106 interacts with the given winning digital component, the client device 106 transmits a request to the DCDS 110 for a resource. For example, the client device 106 may select the given winning digital component, which is a link to download a mobile application. Upon selecting the link, the client device 106 transmits a request to access files required to download the mobile application to the DCDS 110. The DCDS 110 determines, based on the data in the request, where to direct the client device 106.

In some examples, the DCDS 110 directs the client device 106 to one or more intermediary servers to provide the intermediary servers with interaction data indicating the interaction with the given winning digital component at the client device 106. These intermediary servers may include the intermediary servers 108. In other examples, described in more detail below, the DCDS 110 does not redirect the client device 106 to the intermediary servers, and instead directs the client device 106 directly to the requested destination server that hosts the requested resource.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page.

A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106.

In some situations, the search system 150 can be part of, or interact with, an application store (or an online portal) from which applications can be downloaded for install at a client device 106 in order to present information about downloadable applications that are relevant to a submitted search query. Like other electronic documents, search results pages can include one or more digital component slots in which digital components (e.g., video clips, audio clips, images, or other digital components that can be formatted as advertisements) can be presented.

In some implementations, multiple servers, such as the intermediary servers 108, track user interactions with a particular digital component before a user is directed to an electronic document 105. The DCDS 110, enables a client device to access to an electronic document 105 with fewer redirects than existing methods by providing a client device 106 with access to the electronic document 105 directly, without redirecting the client device 106 to other servers, such as the intermediary servers 108. Instead of redirecting the client device 106 to the intermediary servers 108, the DCDS 110 receives the user's request 112, and transmits the reply 120 with a reference directly to the electronic document 105 that is provided by the electronic document servers 104. If the intermediary servers 108 track user interactions with the particular digital component by way of redirects of the client devices to the intermediary servers 108, the redirect reduction apparatus 111 of the DCDS 110 (or another component of the DCDS 110) will redirect the client device 106 directly to the intermediary server hosting the requested resource, and follow the redirects that the client device 106 would have otherwise followed to provide reporting data to the intermediary servers 108. The reporting data may include user interaction data with the particular digital component, in addition to event data related to other information, as described above.

Figure 2A:
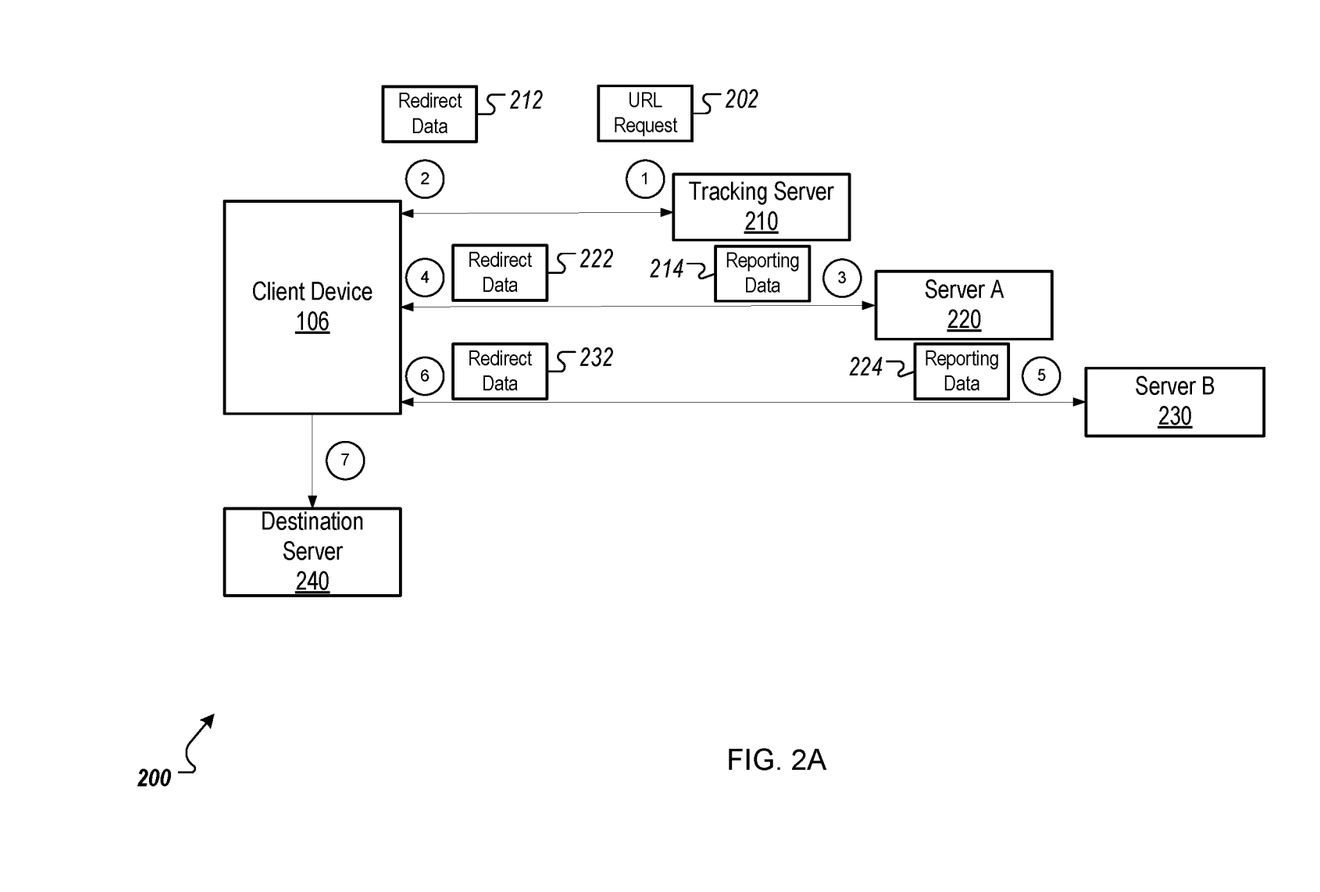
FIGS. 2A-B are example data flows for directing a user to a destination page.

FIG. 2A is an example data flow 200 showing how a client device is directed to a requested resource through a redirect chain. Operations of the data flow 200 are performed by the client device 106 contacting multiple servers, including a tracking server 210, an intermediary server A 220, an intermediary server B 230, and a destination server 240. In some implementations, stages of the flow 200 are performed within a network environment, such as the environment 100.

In some examples, the client device 106 is a mobile device, such as a cellphone, a smartphone, or a tablet, and communicates over a wireless network. The servers 210, 220, 230, and 240 may communicate over a wired network separate from the wireless network over which the client device 106 communicates. For example, the client device 106 may be a smartphone that communicates over a wireless cellular network, while the servers 210, 220, 230, and 240 are remote servers that communicate over wired networks.

The tracking server 210 receives tracking data from the client device 106, and determines a redirect destination for the client device 106 based on the tracking data. For example, the tracking server 210 may determine that the client device 106 has interacted with a digital component provided by a digital component provider through a digital component server. The digital component provider may request interaction tracking data from the interaction of the client device 106 with the digital component for their own analytics, and may request that the client device 106 be redirected to intermediary servers (e.g., their servers or a third party server the digital component provider uses).

Server A 220 tracks interactions between client devices and a particular electronic document. Server A 220 receives interaction data from the client device 106 and uses the interaction data to provide analytics to resource providers such as digital component providers. In some implementations, server A 220 is a third party server maintained by a party separate from the one or more parties that maintain the tracking server 210 and the destination server 240. For example, server A 220 may be maintained by an analytics company, the tracking server 210 may be maintained by a search engine company, and the destination server 240 may be maintained by a digital component provider. A digital component provider that uses server A 220 may request that a client device 106 that interacts with a digital component provided by the digital component provider be directed to server A 220 prior to being directed to the destination server 240 that provides the requested resource so that the interaction with the digital component is logged by server A.

Server B 230 may be a third party server similar to server A 220. For example, server B 230 may also be a third party analytics server used by a digital component provider. In some examples, a digital component provider may use one or more of server A 220 and server B 230 for analytics separate from those provided by the tracking server 210. For example, a particular digital component provider may use both of server A 220 and server B 230 for analytics, and may request that the client device 106 be redirected to both server A 220 and server B 230 to provide interaction tracking data with a particular digital component provided by the particular digital component provider. Server B 230 and may be maintained by a party different than the party that maintains server A 220. For example, server B 230 may be a third party server different from server A 220, and server B 230 may be used by a digital component provider The destination server 240 hosts resources and provides a resource requested by a client device 106 when the client device 106 requests the resource from the destination server 240 (e.g., through a redirect). For example, if the client device 106 requests files required for the installation of an application, the destination server 240 may provide the requested files when the client device 106 is directed to the destination server 240 (e.g., by way of a redirect instruction issued by server B 230). In another example, if the client device 106 requests a security token for access to a particular website, the destination server 240 may provide the security token when the client device 106 is directed to the destination server 240.

The flow 200 begins with stage (1), in which the tracking server 210 receives a URL request 202 from the client device 106. The URL request 202 is transmitted by the client device 106 to the tracking server 210 when the client device interacts with a digital component. For example, if a user of the client device 106 clicks a link to download a new web browser, the link causes the client device 106 to transmit a URL request 202 to the tracking server 210. The URL request 202 includes interaction tracking data from the client device 106. For example, the URL request 202 can include tracking data such as an indication of the interaction, the digital component with which the client device 106 interacted, and an identifier that uniquely identifies the client device 106. In some implementations, the URL request 202 includes an indication of the provider of the digital component and the location of the destination server 240 that hosts the requested resource.

The URL request 202 can identify one or more intermediary servers to which the tracking server 210 to redirect the client device 106 prior to being directed to the destination server 240 and the requested resource. Alternatively, the tracking server 210 can store the information identifying the one or more intermediary servers that are to be contacted. For example, the digital component provider may use third party servers different from the tracking server 210 to perform independent analytics on interaction data with digital components provided by the digital component provider. In this particular example, the digital component provider has requested that the client device 106 be redirected to server A 220 after contacting the tracking server 210 and prior to being directed to the destination server 240.

The flow 200 continues with stage (2), in which the tracking server 210 transmits redirect data 212 to the client device 106. The tracking server 210 detects redirect information within the URL request 202 (or from in a data store), and provides redirect data 212 to the client device 106, causing the client device 106 to be redirected to an intermediary server between the tracking server 210 and the destination server 240. In some examples, the redirect data 212 is an example of the reply 120. The redirect data 212 includes an indication of a particular server to which the client device 106 is being directed and can include a redirect 301 or redirect 302 command. In this particular example, the redirect data 212 directs the client device 106 to server A 220. Each intermediary server stores information identifying a next server to which a device is to be redirected when the device contacts the intermediary server.

The flow 200 continues with stage (3), in which the client device 106 transmits reporting data 214 to server A 220. The reporting data 214 contains interaction tracking data that are used by server A 220 to track client device interactions with the particular digital component. In some implementations, the interaction tracking data includes a portion of code with which interactions are tracked. The interaction tracking data can include other data, such as an identifier that uniquely identifies the client device 106, an identifier that uniquely identifies the digital component with which the client device 106 interacted, a server identifier, and/or location information of the client device 106.

The flow 200 continues with stage (4), in which server A 220 transmits redirect data 222 to the client device 106. The redirect data 222 indicate the next intermediary server to which the client device 106 is directed prior to being directed to the destination server 240. For example, the tracking server 210 can identify that the first intermediary server to which the client device 106 is directed is server A 220 and transmit the redirect data 212 to the client device 106. Server A 220 accesses data that indicate the next intermediary server as well as data requested by the next intermediary server. For example, server A 220 can access data that indicate an address of server B 230 and the particular interaction tracking data requested by server 230 B. Server A 220 extracts the particular interaction tracking data requested by server 230 B from the reporting data 214 or the URL request, and generates the redirect data 222 using the particular interaction tracking data and the address of server B 230. Server A 220 then transmits the redirect data 222 to the client device 106. In some examples, server A 220 may modify the redirect data 212 to indicate that the client device 106 has reached the first intermediary server to generate the redirect data 222.

The flow 200 continues with stage (5), in which the client device 106 transmits the reporting data 224 to server B 230. The client device 106 is directed to server B 220 by the redirect data 222, and is instructed to provide the reporting data 224 to server B 230. The reporting data 224 include data requested by server B 230, such as interaction tracking data as described above. In some examples, server A 220 generates the reporting data 224 by modifying the reporting data 214. For example, server A 220 can indicate in the reporting data 224 that the data has been received by server A 220.

The flow 200 continues with stage (6), in which server B 230 transmits redirect data 232 to the client device 106. Server B 230 determines that all intermediary servers to which the client device 106 should be directed have been reached. In some examples, server B 230 accesses the reporting data 224 to determine that the client device has reached all intermediary servers. Server B 230 then provides redirect data 232 to the client device 106 to direct the client device 106 to the destination server 240.

The flow 200 continues with stage (7), in which the client device 106 is directed to the destination server 240. The redirect data 232 includes location data for the destination server 240. The client device 106 receives the redirect data 232 and is directed to the destination server 240 to access the requested resource. The client device 106 may download the requested resource from the destination server 240.

In some implementations, there may be more or fewer intermediary servers. There is at least one intermediary server between when the client device 106 requests a resource and when the client device 106 is directed to the destination server 240 to access the resource.

When a client device is directed to a resource requested by the client device following the data flow 200, unintended processes, and the accompanying latency or errors, may occur. For example, a separate web browser window or application superfluous to the accessing of the resource may be opened. In some examples, an intermediary server may redirect the client device to an incorrect resource or location. For example, a third party intermediary server may force the client device to open a web browser to a landing page for a particular mobile app requested for installation by the client device instead of opening an app store to begin downloading the files required for installation of the app.

These additional processes increase latency between when a resource is requested and when the client device is directed to the resource. For example, an increase in latency can be incurred for each redirect that the client device is subjected to, and as the number of intermediary servers to which the client device is directed increases, the wait time for the user of the client device increases. Additionally, there is a potential for a dropped connection at each redirect. This potential is particularly pronounced on wireless networks, such as mobile/cellular networks that can be unreliable.

Figure 2B:
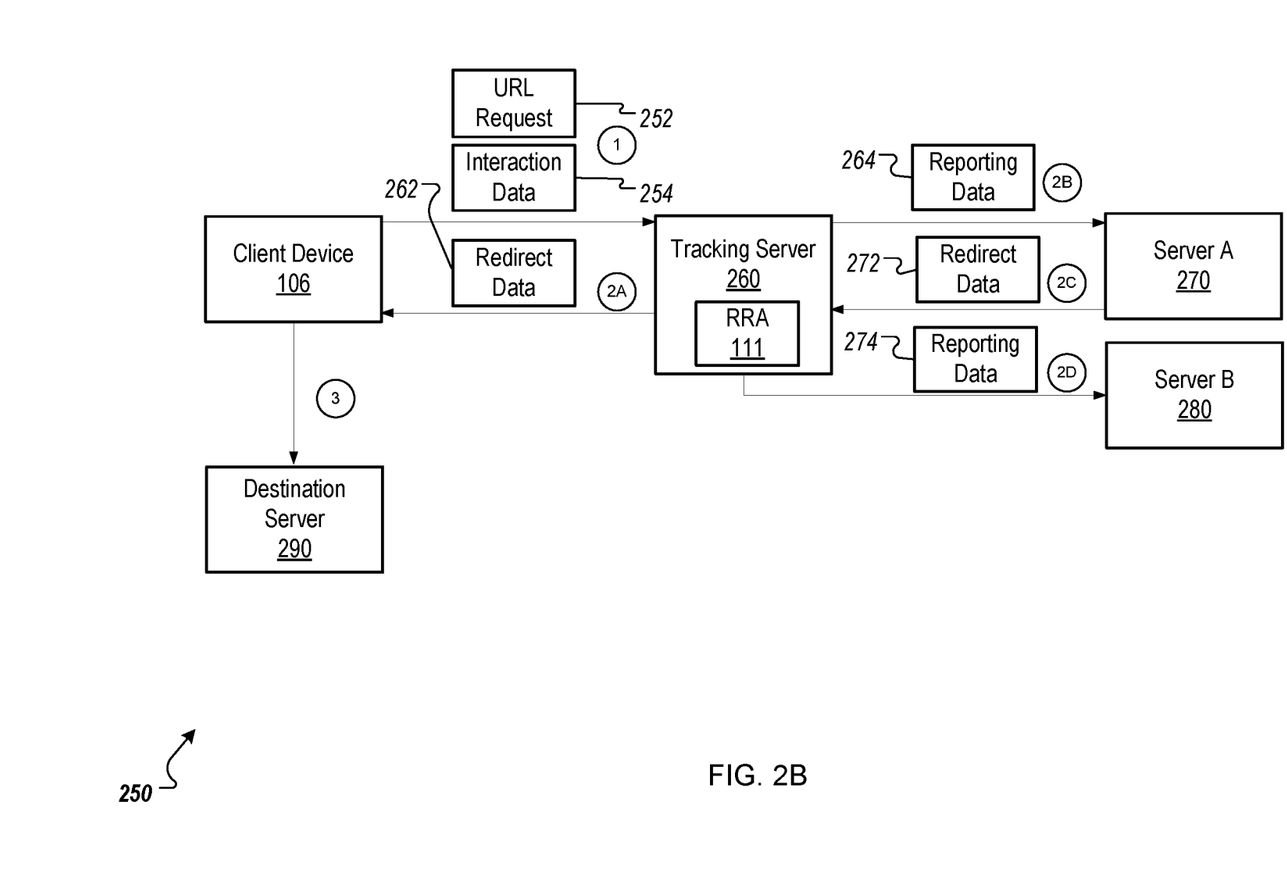

FIG. 2B is an example data flow 250 for directing a client device to a requested resource with fewer redirects than required by the data flow 200. The flow 250 reduces the number of redirects the client device is subjected to prior to being directed the resource requested by the client device, reducing the latency and potential for breaks in the chain of direction the client device follows. The flow 250 involves a tracking server 260, a server A 270, a server B 280, and a destination server 290. The tracking server 260 is an example of the redirect reduction apparatus 111 as described above with respect to FIG. 1, and includes hardware and/or code that enables the tracking server 260 to reduce the number of redirects that a client device is subjected to. In some examples, the tracking server 260 is a tracking server that includes the redirect reduction apparatus 111 and is able to reduce the number of redirects that a client device is subjected to using the redirect reduction apparatus 111.

In some examples, the client device 106 is a mobile device, such as a cellphone, a smartphone, or a tablet, and communicates over a wireless network. In some examples, the servers 260, 270, 280, and 290 may communicate over a wired network separate from the wireless network over which the client device 106 communicates. For example, the client device 106 may be a smartphone that communicates over a wireless cellular network, while the servers 260, 270, 280, and 290 are remote servers that communicate over wired networks.

The flow 250 begins with stage (1), in which the tracking server 260 receives a URL request 252 and interaction data 254. The URL request 252 may be similar to the URL request 202. The tracking server 260 receives the URL request 252 and the interaction data 254 and generates a structured response to transmit to the client device 106.

The URL request 252 includes data that indicates the location of the destination server 290 which the tracking server 260 uses to generate the response transmitted to the client device 106. For example, the URL request 252 may include a header, or a string that indicates particular characteristics of the URL request 252. The header may include a particular bit that indicates whether there are intermediary servers to which the client device 106 should be directed to provide interaction data, such as the interaction data 254, prior to being directed to the destination server 290. The tracking server 260 may determine, based on the value of the particular bit, that there are intermediary servers, and proceed to identify the location of the destination server 290. In some examples, the tracking server 260 checks credentials of a resource against sources of the resource to determine whether there are intermediary servers. The tracking server 260 then generates a response to the client device 106 with the location of the destination server 290 instead of directing the client device 106 to the intermediary servers.

The tracking server 260 may callout to a proxy server if the URL request 252 indicates that a proxy should be used. For example, if the appropriate bit is set in the header of the URL request 252, the tracking server 260 can callout to a proxy server. In some implementations, the proxy server may be a postback proxy server that pings networks and servers external to the host environment of the tracking server 260. In the flow 250, once the tracking server 260 has determined, based on the URL request 252, that there are intermediary servers to which the client device 106 is to be directed, the tracking server 260 determines that the client device 106 is to be directed to the destination server 290 instead of the intermediary servers, and the tracking server 260 will provide the requested interaction data to the intermediary servers identified in the URL request 252.

The flow 250 continues with stage (2). In this particular example, several steps occur within stage (2), which includes a stage (2A), a stage (2B), a stage (2C), and a stage (2D). Stages (2A) and (2B), (2C), and (2D) may occur simultaneously. For example, stage (2A) may occur in parallel with stages (2B), (2C), and (2D). The stages (2B), (2C), and (2D) occur sequentially.

During stage (2A) the tracking server 260 provides redirect data 262 to the client device 106. Once the tracking server 260 has received the URL request 252 and determined that there are intermediary servers to which the client device 106 should be directed, the tracking server 260 generates a structured response containing the redirect data 262 indicating the location of the destination server 290. The redirect data 262 can include an HTTP referrer, or a field of the header of the URL request 262 that identifies the address of a webpage that linked to the resource being requested. For example, the referrer can indicate a blog post, or the origin location of the client device 106, that links to a particular mobile application being requested by the client device 106. In such an example, the mobile application is hosted by the destination server 260.

The redirect data 262 includes data that directs the client device 106 to the destination server 290 that hosts the resource requested by the client device 106. For example, the redirect data 262 can include the location of the destination server 290 and code that instructs the client device 106 to access the requested resource from the destination server 290.

While the stage (2A) is being performed, the tracking server 260 identifies the intermediary servers to which the client device 106 should provide interaction data, such as the interaction data 254.

In some implementations, the intermediary servers are third party servers hosted externally to the environment in which the tracking server 290 and/or the destination server 290 is hosted. In order to ping the third party intermediary servers, the tracking server 260 can contact the proxy server to request that the proxy server ping the intermediary servers. Pinging a server can include contacting the server as well as providing various information to the server. For example, pinging of a server can include providing information extracted from a received URL request and/or other information related to the URL request (e.g., information stored in a data store and/or indexed to the URL request and/or an identifier corresponding to the URL request). In some implementations, the tracking server 260 can ping intermediary servers to provide the intermediary servers with information included in the originally received URL request 262. The proxy server allows the tracking server 260 to make low-latency remote procedure calls (RPCs) in order to communicate with the intermediary servers, such as server A 270 and server B 280. In some examples, the proxy server has a high time-out deadline to handle long periods of delay in receiving responses from the pings. In some examples, the proxy server can retry pinging the intermediary servers if the time-out deadline has passed. In some examples, the ping is a non-blocking ping that returns a result immediately without putting the server thread that performs the ping to sleep, reducing the latency by eliminating blocking that delays execution of other processes performed by the server.

During stage (2B) the tracking server 260 pings server A 270 with a request including reporting data 264. The reporting data 264 includes at least a portion of the interaction data 254 transmitted to the tracking server 260 from the client device 106. Server A 270 can use the reporting data 264 to produce analytics for a provider of the digital component with which the client device 106 interacted. For example, server A 270 can be a third party analytics server that analyzes the reporting data 264 to provide a digital component provider with interaction statistics independent from the statistics provided by the tracking server 260.

In some examples, when the tracking server 260 requests that the proxy server pings the intermediary servers, the tracking server 260 starts a counter when a ping of a particular intermediary server is initiated and tracks the amount of time that has elapsed while waiting for a response to the ping. If a particular time-out deadline has been reached, the tracking server 260 may request that the proxy server retry pinging the particular intermediary server.

During stage (2C) the tracking server 260 receives redirect data 272 from server A 270. Upon receiving the reporting data 264 from the tracking server 260, the server 270 transmits the redirect data 272 to the tracking server 260. The redirect data 272 directs the tracking server 260 to server B 280. In some examples, the redirect data 272 instructs the tracking server 260 to provide reporting data including interaction data to server B 280. In flow 200 and other such processes for directing a client device to a requested resource, server A 270 would transmit the redirect data 272 to the client device 106. By contrast, in flow 250, the tracking server 260 detects that there are intermediary servers and pings the servers to intercept and follow each redirect to reduce the number of redirects that a client device 106 is subjected to.

During stage (2D) the tracking server 260 pings server B 280 with a request including the reporting data 264. The tracking server 260 pings server B 280 in the same way that the tracking server 260 pings server A 270. The tracking server 260 generates the reporting data 264 to provide to server B 280. In some examples, the reporting data 264 is generated based on the redirect data 272 provided to the tracking server 260. In some examples, the tracking server 260 can modify the reporting data 264 to generate the reporting data 274 to indicate that the interaction tracking data has been provided to a previous intermediary server. For example, the tracking server 260 can generate the reporting data 274 to indicate that the interaction tracking data requested by server A 270 was received. The tracking server 260 can include data from the redirect data 272 received from server A 270 in the reporting data 274 provided to the server 280. For example, the tracking server 260 can include some or all of the redirect data 272 in the reporting data 274. Server B 280 can use the indication that the data was received by server A 270 to generate reports or to provide interaction statistics to a digital component provider. For example, server B 280 can provide statistics to a digital component provider indicating the number of intermediary servers to which the interaction tracking data for the client device 106 has been provided.

The tracking server 260 can determine, from the redirect data 272, that there are no further intermediary servers to which interaction tracking data are to be provided, and the tracking server 260 will not ping any further intermediary servers. In some examples, the tracking server 260 can receive data from server B 280 that indicate that all intermediary servers to which interaction tracking data for the client device 106 are to be provided have been reached.

In some examples, the stages (2B), (2C), and (2D) are performed sequentially and the stage (2B) is initiated in parallel with the stage (2A) in which the tracking server 260 provides the redirect data 262 to the client device 106 that directs the client device to the destination server 290.

The flow 250 continues with stage (3), in which the client device 106 is directed to the destination server 290 through the redirect data 262. The stage (3) occurs sequentially after the stage (2A), and occurs asynchronously from the stages (2B), (2C), and (2D). The redirect data 262 includes location data for the destination server 290 and data that instruct the client device 106 to request the resource from the destination server 290. The client device 106 may download the requested resource from the destination server 290.

By enabling the client device 106 to bypass redirects to intermediary servers between requesting a resource and accessing the resource at the destination server 290, the flow 250 reduces latency for a user of the client device and eliminates possible points of failure at each redirect where a connection between the client device 106 and a network providing access to the intermediary servers could be dropped.

Figure 3:
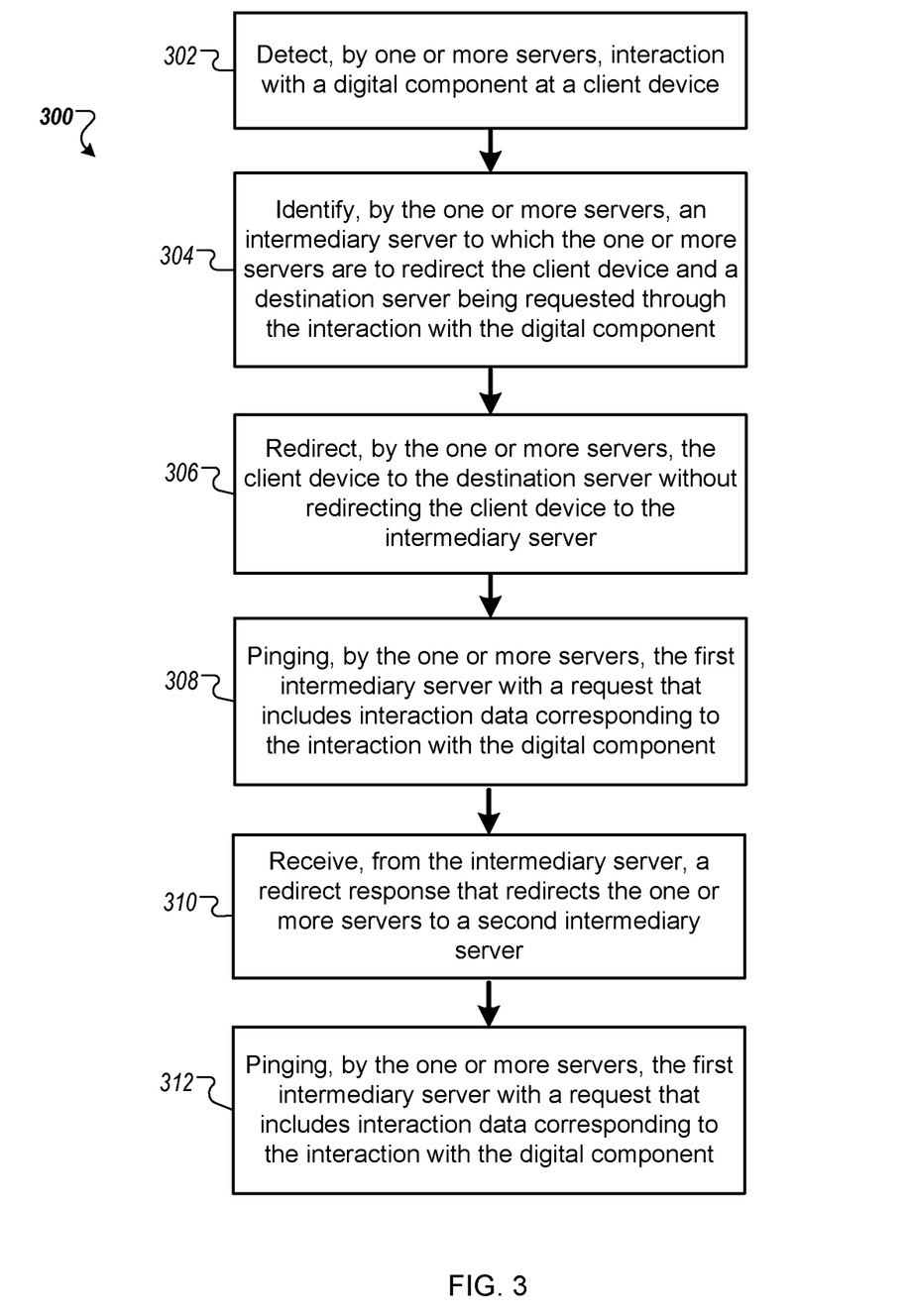
FIG. 3 is a flow chart of an example process for directing a user to a destination page.

FIG. 3 is a flow chart of an example process 300 for directing a user to a requested resource. In some implementations, the process 300 can be implemented by one or more servers. For example, the process 300 can be implemented by the tracking server 260, server A 270, server B 280, and the destination server 290 of FIG. 2B. In some implementations, the process 300 can be implemented as instructions stored on a non-transitory computer readable medium, and when the instructions are executed by one or more servers, the instructions can cause the one or more servers to perform operations of the process 300.

One or more servers detect an interaction with a digital component at a client device (302). The client device can be a mobile device communicating over a wireless communications network. In some implementations, one or more servers can be used to implement the tracking server 260, which detects an interaction with a digital component at the client device 106. The one or more servers communicate over a wired communications network independent of the mobile device. For example, as discussed above with reference to FIG. 1, an interaction with a particular digital component can cause the client device to initiate a request for a resource. As discussed above, the client device can include various event data in the resource request, and can include data specifying the digital component and the provider of the digital component with which the client device interacted. In response to the interaction, the tracking server can redirect the client device to a destination server specified in a URL received from the client device, and follow a multi-server redirect path that the client device would have followed had the tracking server not redirected the client device to the destination server, as described in more detail below.

The one or more servers identify an intermediary server to which the one or more servers are to redirect the client device and a destination server being requested through interaction with the digital component (304). In some implementations, the tracking server 260 identifies server A 270 and server B 280, to which the tracking server 260 is to redirect the client device 106 before being directed to the destination server 290 to access the resource requested through interaction with the digital component. For example, as discussed above with respect to FIG. 2B, the tracking server 260 can identify the intermediary servers 270 and 280 as well as the destination server 290. In some implementations, the tracking server examines a URL used to contact the tracking server, and extracts information specifying a path of the intermediary server to which the client device is to be redirected. Alternatively, the tracking server can identify the particular digital component with which the interaction occurred, and look up the path of the intermediary server in a data structure that maps digital components to intermediary servers.

The one or more servers redirect the client device to a destination server without directing the client device to the intermediary server (306). In some implementations, the tracking server 260 can redirect the client device 106 to the destination server 290 without directing the client device to the intermediary servers 270 and 280. For example, as discussed above with respect to FIG. 2B, the tracking server 260 can perform stage (2A), in which the client device 106 is directed to the destination server 290, independently from stages (2B), (2C), and (2D).

The one or more servers ping the intermediary server with a request that includes interaction data corresponding to the interaction with the digital component (308). In some implementations, the tracking server 260 pings the intermediary servers, server A 270 and server B 280 with requests that include interaction data corresponding to the interaction with the digital component. For example, as discussed above with respect to FIG. 2B, the tracking server 260 can perform stages (2B) or (2D) to ping server A 270 or server B 280, respectively. In some examples, the tracking server 260 transmits a request to a proxy server to perform the pings. In some implementations, the tracking server 260 pings the intermediary server by initiating a second redirect path that differs from the redirection of the client device to the destination server.

In some implementations, the tracking server 260 pings the intermediary server, such as server A 270, by starting a counter when the pinging is initiated, and tracking an amount of time that elapses during the pinging with the request using the counter. The tracking server 260 can retry pinging the intermediary server or servers such as server A 270 or server B 280.

The one or more servers receive, from the intermediary server, a redirect response that redirects the one or more servers to a second intermediary server (310). For example, the one or more servers can receive a redirect response from the intermediary server indicating the location of a second intermediary server. In some implementations, the tracking server 260 receives redirect data 272 that direct the tracking server 260 to a second intermediary server, or server B 280.

The one or more servers ping the second intermediary server with a second request that includes data from the redirect response (312). For example, the one or more servers can ping the second intermediary server through a proxy server that performs external communication for the one or more servers for the one or more servers. In some implementations, the tracking server 260 pings server B 280 with a second request that includes data from the redirect data 272.

There may be more than one intermediary server identified by the one or more servers. In such examples, the one or more servers can receive redirect data from each of the intermediary servers directing the one or more servers to a subsequent intermediary server. For example, as discussed above with respect to FIG. 2B, the tracking server 260 can be redirected to server B 280 in stage (2C).

Figure 4:
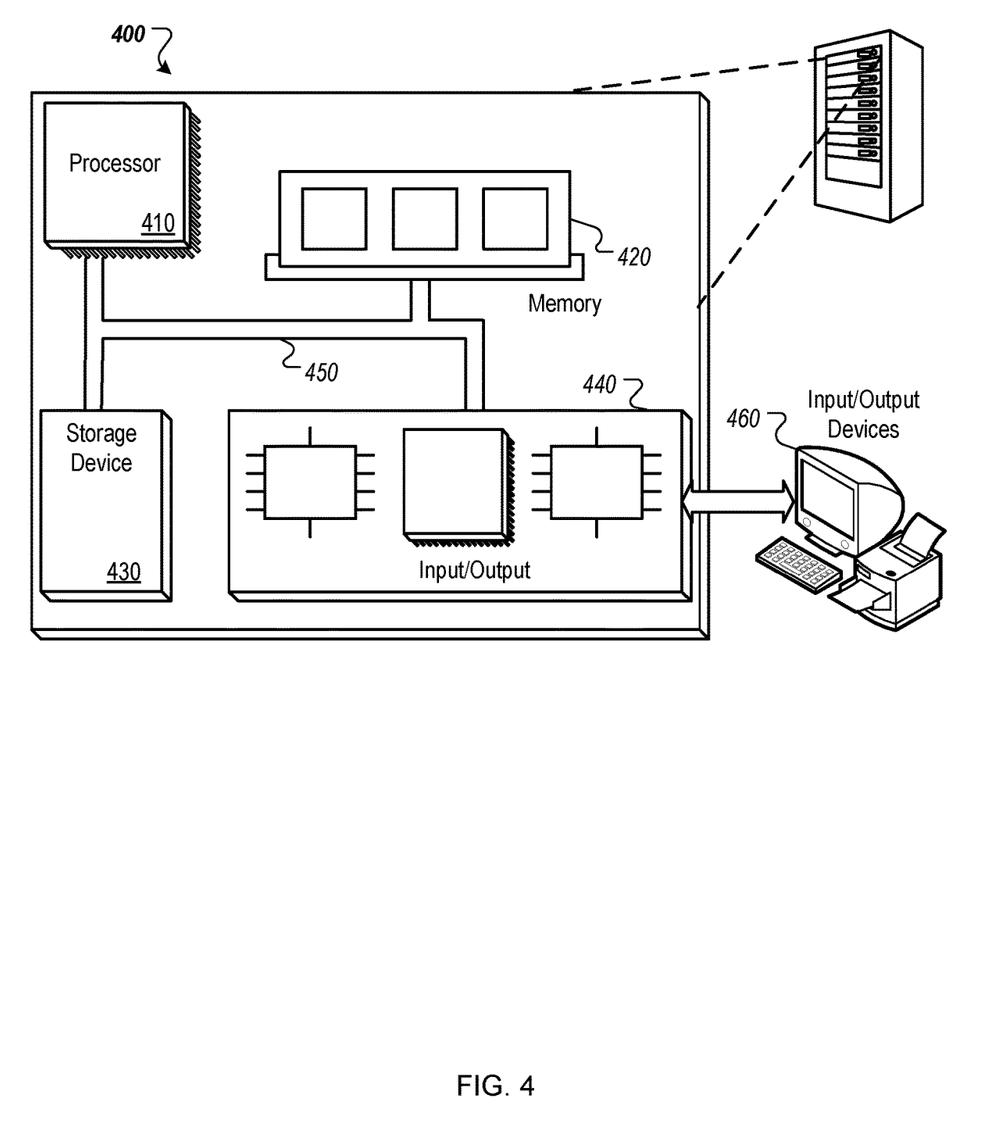
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    detecting, by one or more servers, interaction with a digital component at a client device based on a request, including a URL, that is received from the client device by the one or more servers;
    after detecting the interaction with the digital component at the client device:
        identifying, by the one or more servers and based on the contents of the request, a redirect path that includes an intermediary server to which the one or more servers are to redirect the client device and a destination server being requested through the interaction with the digital component;
        redirecting, by the one or more servers, the client device to the destination server without redirecting the client device along a redirect path that begins with the intermediary server and ends with the destination server; and
        following, by the one or more servers rather than the client device, the redirect path that begins with the intermediary server, including pinging the intermediary server with an interaction request that includes interaction data corresponding to the interaction with the digital component and following a subsequent redirect from the intermediary server to another server.

2. The method of claim 1, wherein identifying the intermediary server comprises examining a URL used to contact the one or more servers, and extracting information specifying a path of the intermediary server, and
wherein the destination server provides data to the client device that links to a mobile application.

3. The method of claim 1, comprising:
receiving, from the intermediary server, a redirect response that redirects the one or more servers to a second intermediary server; and
pinging, by the one or more servers, the second intermediary server with a second request that includes data from the redirect response.

4. The method of claim 1, wherein pinging the intermediary server comprises initiating a second redirect path that differs from the redirection of the client device to the destination server.

5. The method of claim 1, wherein pinging the intermediary server comprises:
starting a counter when the pinging is initiated;
tracking an elapsed request time using the counter; and
retrying the pinging of the intermediary server when the elapsed request time exceeds a timeout threshold prior to the one or more servers receiving a response from the intermediary server.

6. The method of claim 1, wherein the client device is a mobile device communicating over a wireless communications network and the one or more servers communicate over a wired communications network independent of the mobile device; and
wherein redirecting the client device to the destination server comprises transmitting, to the client and by the one or more servers, a redirect command with the URL of destination server.

7. The method of claim 1, comprising:
following, by the one or more servers, a multi-server redirect path that the client device would have followed had the one or more servers not redirected the client device to the destination server.

8. A system comprising:
a data store storing interaction data corresponding to client-side interaction with various digital components;
a front-end interface that includes a communications interface that enables communication over one or more communications networks;
a tracking server that includes one or more servers that each include one or more processors and is connected to the front-end interface, wherein the tracking server breaks a redirect chain being followed by a client device by performing operations including:
detecting, by the one or more servers, interaction with a digital component at a client device based on a request, including a URL, that is received from the client device by the one or more servers;
after detecting the interaction with the digital component at the client device:
identifying, by the one or more servers and based on the contents of the request, a redirect path that includes a different server to which the one or more servers are to redirect the client device and a destination page being requested through the interaction with the digital component;
redirecting, by the one or more servers, the client device to a destination page without redirecting the client device along a redirect path that begins with the different server and ends with the destination page; and
following, by the one or more servers rather than the client device, the redirect path that begins with the intermediary server, including pinging the different server with an interaction request that includes interaction data corresponding to the interaction with the digital component and following a subsequent redirect from the intermediary server to another server.

9. The system of claim 8, wherein identifying the different server comprises examining a URL used to contact the one or more servers, and extracting information specifying the different server.

10. The system of claim 8, the operations comprising:
receiving, from the different server, a redirect response that redirects the one or more servers to a second different server; and
pinging, by the one or more servers, the second different server with a second request that includes data from the redirect response.

11. The system of claim 8, wherein pinging the different server comprises initiating a second redirect path that differs from the redirection of the client device to the destination page.

12. The system of claim 8, wherein pinging the different server comprises starting a counter when the pinging is initiated; tracking an elapsed request time using the counter; and retrying the pinging of the different server when the elapsed request time exceeds a timeout threshold.

13. The system of claim 8, wherein the client device is a mobile device communicating over a wireless communications network and the one or more servers communicate over a wired communications network independent of the mobile device.

14. The system of claim 8, the operations comprising:
following, by the one or more servers, a multi-server redirect path that the client device would have followed had the one or more servers not redirected the client device to the destination page.

15. A non-transitory computer readable medium storing instructions that when executed by one or more computing devices, cause the one or more computing devices to perform operations comprising:
detecting, by one or more servers, interaction with a digital component at a client device based on a request, including a URL, that is received from the client device by the one or more servers;
after detecting the interaction with the digital component at the client device:
identifying, by the one or more servers and based on the contents of the request, a redirect path that includes a different server to which the one or more servers are to redirect the client device and a destination page being requested through the interaction with the digital component;
redirecting, by the one or more servers, the client device to a destination page without redirecting the client device along a redirect path that begins with the different server and ends with the destination page; and
following, by the one or more servers rather than the client device, the redirect path that begins with the intermediary server, including pinging the different server with an interaction request that includes interaction data corresponding to the interaction with the digital component and following a subsequent redirect from the intermediary server to another server.

16. The non-transitory computer readable medium of claim 15, wherein identifying the different server comprises examining a URL used to contact the one or more servers, and extracting information specifying the different server.

17. The non-transitory computer readable medium of claim 15, the operations further comprising:
   receiving, from the different server, a redirect response that redirects the one or more servers to a second different server; and
   pinging, by the one or more servers, the second different server with a second request that includes data from the redirect response.

18. The non-transitory computer readable medium of claim 15, wherein pinging the different server comprises initiating a second redirect path that differs from the redirection of the client device to the destination page.

19. The non-transitory computer readable medium of claim 15, wherein pinging the different server comprises starting a counter when the pinging is initiated; tracking an elapsed request time using the counter; and retrying the pinging of the different server when the elapsed request time exceeds a timeout threshold.

20. The non-transitory computer readable medium of claim 15, wherein the client device is a mobile device communicating over a wireless communications network and the one or more servers communicate over a wired communications network independent of the mobile device.

* * * * *

UNITED STATES PATENT AND TRADEMARK OFFICE
CERTIFICATE OF CORRECTION

Page 1 of 1

PATENT NO. : 10,536,547 B2
APPLICATION NO. : 15/477713
DATED : January 14, 2020
INVENTOR(S) : Toksoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 131 days.

Signed and Sealed this
Eighth Day of September, 2020

Andrei Iancu
*Director of the United States Patent and Trademark Office*